United States Patent
Clayton et al.

(10) Patent No.: US 12,445,801 B2
(45) Date of Patent: Oct. 14, 2025

(54) EXPANSION OF GEO-FENCE SIZE BASED ON A TAG'S LIKELY LOCATION

(71) Applicant: ZEBRA TECHNOLOGIES CORPORATION, Lincolnshire, IL (US)

(72) Inventors: Richard Mark Clayton, Manorville, NY (US); Patrick Martin Brown, North Medford, NY (US); Andrew Ehlers, Elmhurst, IL (US); Seth David Silk, Barrington, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 466 days.

(21) Appl. No.: 17/957,930

(22) Filed: Sep. 30, 2022

(65) Prior Publication Data
US 2024/0114314 A1     Apr. 4, 2024

(51) Int. Cl.
*H04W 4/021* (2018.01)
*H04W 4/33* (2018.01)
*H04W 4/80* (2018.01)

(52) U.S. Cl.
CPC .............. *H04W 4/021* (2013.01); *H04W 4/33* (2018.02); *H04W 4/80* (2018.02)

(58) Field of Classification Search
CPC ......... H04W 4/021; H04W 4/33; H04W 4/80; H04W 4/022
USPC ........................................................ 455/456.1
See application file for complete search history.

(56) References Cited

U.S. PATENT DOCUMENTS

| | | | |
|---|---|---|---|
| 9,894,478 B1 | 2/2018 | DeLuca et al. | |
| 11,715,563 B1* | 8/2023 | Fox ........................ | G16H 50/30 705/2 |
| 12,231,986 B2* | 2/2025 | Kurian ................. | H04W 12/06 |
| 2011/0148634 A1 | 6/2011 | Putz | |
| 2013/0099977 A1* | 4/2013 | Sheshadri ............. | H04W 4/022 342/450 |
| 2017/0171704 A1 | 6/2017 | Frenz | |
| 2020/0204948 A1 | 6/2020 | Kell et al. | |
| 2021/0058735 A1 | 2/2021 | Wirola et al. | |
| 2022/0051259 A1* | 2/2022 | Benkreira ......... | G06Q 20/0655 |
| 2022/0221547 A1* | 7/2022 | Wenrich ................ | G16H 40/20 |
| 2023/0039932 A1* | 2/2023 | Booij ...................... | G01S 11/14 |

OTHER PUBLICATIONS

International Search Report and Written Opinion for International Application No. PCT/US2023/28191 mailed on Oct. 19, 2023.

* cited by examiner

*Primary Examiner* — Hirdepal Singh

(57) ABSTRACT

Techniques for adjusting the sizes of geo-fences based on an individual's likely location are disclosed herein. An example method includes determining one or more geo-fenced zones corresponding to one or more respective areas; receiving location information indicative of the one or more areas expected to be visited by the individual, of the one or more respective areas; and adjusting the one or more geo-fenced zones based on the one or more respective areas expected to be visited by the individual.

27 Claims, 12 Drawing Sheets

| RSSI Boost | Room A Higher Seconds (Of 728) | Accuracy Percent* | Max Consecutive Seconds Of Error |
|---|---|---|---|
| 0 | 479 | 66% | 8 |
| 5 | 614 | 84% | 4 |
| 10 | 697 | 96% | 2 |
| 15 | 719 | 99% | 1 |
| 20 | 724 | 99% | 1 |

FIG. 4

| RSSI Boost | Room B Higher Seconds (Of 705) | Accuracy Percent* | Max Consecutive Seconds Of Error |
|---|---|---|---|
| 0 | 669 | 95% | 2 |
| 5 | 699 | 99% | 1 |
| 10 | 705 | 100% | 0 |
| 15 | 705 | 100% | 0 |
| 20 | 705 | 100% | 0 |

FIG. 5

EXPANSION OF GEO-FENCE SIZE BASED ON A TAG'S LIKELY LOCATION

BACKGROUND

As hospitals continue to adopt location technologies for passive patient tracking, fewer manual intervention efforts are required to keep patient tracking information up to date. Passive tracking has helped to mitigate the need for manual searches and reduce nursing staff frustration since patient movement within a hospital generally follow a standard process. For instance, patients may wear a signal-transmitting tag, e.g., on a lanyard or wristband, and signal receivers may be positioned in various locations within the hospital, such that an estimate of a patient's location may be determined based on the strength of the signal received by the receivers at each of the various locations. However, the receivers that are closest to the transmitter do not always receive the strongest signals from the transmitter, due to factors such as the composition of the walls of the building, the configurations of the rooms of the building, the actual positions of the signal receivers in the various rooms of the building, individuals in the rooms, etc. Determining an estimated location of the transmitter and comparing the transmitter's location to geo-fenced zones associated with each location, can lead to similar issues, resulting in a patient's location "drifting" between possible rooms. Consequently, the specific room where the patient is located cannot always be accurately identified, which can lead to problems in the hospital environment.

SUMMARY

In an embodiment, the present invention is a system for adjusting the strengths of signals received from a transmitter based on the transmitter's likely location, comprising: a transmitter associated with an individual; one or more receivers configured to receive one or more signals transmitted by the transmitter, the one or more receivers being positioned at respective receiver locations corresponding to one or more respective areas; one or more processors; and a memory storing computer-readable instructions that, when executed by the one or more processors, cause the one or more processors to: receive location information indicative of one or more receiver locations corresponding to one or more respective areas expected to be visited by the individual; receive measurements indicative of signal strengths of one or more signals transmitted by the transmitter and received by the one or more receivers; adjust the received measurements indicative of the signal strengths of the one or more signals transmitted by the transmitter based on the one or more respective areas expected to be visited by the individual.

In a variation of this embodiment, the instructions, when executed by the one or more processors, further cause the one or more processors to identify an area associated with the individual based on the adjusted measurements.

For instance, the instructions, when executed by the one or more processors, may further cause the one or more processors to: receive timing information indicative of a range of time at which the identified area is expected to be visited by the individual, the range of time having a start time and a stop time; determine that the individual is visiting the identified area (i) prior to the start time, (ii) between the start time and the stop time, or (iii) after the stop time, of the range of time at which the identified area is expected to be visited by the individual; and, based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

Furthermore, in a variation of this embodiment, the signals are one of radio frequency identification wireless signals and BLUETOOTH low energy (BLE) wireless signals.

Additionally, in a variation of this embodiment, causing the one or more processors to adjust the received measurements indicative of the signal strengths of the one or more signals transmitted by the transmitter includes one of: incrementally changing the received measurements by a first predetermined value based on the one or more respective areas expected to be visited by the individual, and multiplying the received measurements by a second predetermined value based on the one or more respective areas expected to be visited by the individual. For instance, each of the first predetermined value and the second predetermined value may be set by a user. Additionally, in some examples, each of the first predetermined value and the second predetermined value may be determined based on historical measurements indicative of signal strengths received by the one or more receivers positioned at the respective receiver locations corresponding to the one or more respective areas expected to be visited by the individual.

Moreover, in a variation of this embodiment, the one or more respective areas include one or more respective rooms of a facility.

Additionally, in a variation of this embodiment, the system may further include a second transmitter associated with a second individual, and the one or more processors may receive second location information indicative of one or more receiver locations corresponding to one or more respective areas expected to be visited by the second individual; and in response to not receiving measurements indicative of signal strengths of one or more signals transmitted by the second transmitter and intended to be received by the one or more receivers, generate predetermined measurements indicative of signal strengths of the one or more signals transmitted by the second transmitter and intended to be received by the one or more receivers based on the one or more respective areas expected to be visited by the second individual.

In another embodiment, the present invention is a system for adjusting the strengths of signals received from a transmitter based on the transmitter's likely location, comprising: a first transmitter associated with a first individual; a second transmitter associated with a second individual; one or more receivers configured to receive one or more signals transmitted by the first and second transmitters, the one or more receivers being positioned at respective receiver locations corresponding to one or more respective areas; one or more processors; and a memory storing computer-readable instructions that, when executed by the one or more processors, cause the one or more processors to: receive location information indicative of one or more receiver locations corresponding to at least one of one or more respective areas expected to be visited by the first individual and one or more respective areas not expected to be visited by the second individual; receive measurements indicative of signal strengths of one or more signals transmitted by the first and second transmitters and received by the one or more receivers; and adjust the received measurements indicative of the signal strengths of the one or more signals transmitted by one of the first transmitter and the second transmitter based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

In a variation of this embodiment, causing the one or more processors to adjust the received measurements indicative of the signal strengths of the one or more signals transmitted by one of the first transmitter and the second transmitter includes: one of incrementally changing the received measurements by a third predetermined value based on the one or more respective areas expected to be visited by the first individual and multiplying the received measurements by a fourth predetermined value based on the one or more respective areas expected to be visited by the first individual when the first individual is present in the one or more respective areas expected to be visited by the first individual; or one of decrementally changing the received measurements by a fifth predetermined value based on the one or more respective areas not expected to be visited by the second individual and dividing the measurements by a sixth predetermined value based on the one or more respective areas not expected to be visited by the second individual when each of the first individual and the second individual is present in the one or more respective areas expected to be visited by the first individual.

For instance, each of the third, fourth, fifth and six predetermined values may be set by a user.

Moreover, in some examples, each of the third predetermined value and the fourth predetermined value may be determined based on historical measurements indicative of signal strengths received by the one or more receivers positioned at the respective receiver locations corresponding to the one or more respective areas expected to be visited by the first individual, and each of the fifth predetermined value and the sixth predetermined value may be determined based on historical measurements indicative of signal strengths received by the one or more receivers positioned at the respective receiver locations corresponding to the one or more respective areas not expected to be visited by the second individual.

In yet another embodiment, the present invention is a computer-implemented method for adjusting the strengths of signals received from a transmitter based on the transmitter's likely location, comprising: receiving, by one or more processors, location information corresponding to one or more respective areas expected to be visited by an individual; receiving, by the one or more processors, measurements indicative of signal strengths of one or more signals transmitted by a transmitter associated with the individual and received by one or more receivers configured to receive one or more signals transmitted by the transmitter, the one or more receivers being positioned at respective receiver locations corresponding to one or more respective areas; and adjusting, by the one or more processors, the received measurements indicative of the signal strengths of the one or more signals transmitted by the transmitter based on the one or more respective areas expected to be visited by the individual.

In a variation of this embodiment, the method may include identifying, by the one or more processors, an area associated with the individual based on the adjusted measurements.

Furthermore, in a variation of this embodiment, the method may include: receiving, by the one or more processors, timing information indicative of a range of time at which the identified area is expected to be visited by the individual, the range of time having a start time and a stop time; determining, by the one or more processors, that the individual is visiting the identified area (i) prior to the start time, (ii) between the start time and the stop time, or (iii) after the stop time, of the range of time at which the identified area is expected to be visited by the individual; and based on determining that the individual is visiting the identified area (i) prior to the start time, (ii) between the start time and the stop time, or (iii) after the stop time, of the range of time at which the identified area is expected to be visited by the individual, triggering, by the one or more processors, one or more actions related to the identified area.

Moreover, in a variation of this embodiment, the signals are one of radio frequency identification wireless signals and BLUETOOTH low energy (BLE) wireless signals.

Additionally, in a variation of this embodiment, adjusting the received measurements indicative of the signal strengths of the one or more signals transmitted by the transmitter includes one of: incrementally changing the received measurements by a first predetermined value based on the one or more respective areas expected to be visited by the individual, and multiplying the received measurements by a second predetermined value based on the one or more respective areas expected to be visited by the individual.

For instance, each of the first predetermined value and the second predetermined value may be set by a user.

In some examples, each of the first predetermined value and the second predetermined value may be determined based on historical measurements indicative of signal strengths received by the one or more receivers positioned at the respective receiver locations corresponding to the one or more respective areas expected to be visited by the individual.

Moreover, in a variation of this embodiment, the one or more respective areas include one or more respective rooms of a facility.

Furthermore, in a variation of this embodiment, the method may include receiving, by the one or more processors, second location information indicative of one or more receiver locations corresponding to one or more respective areas expected to be visited by a second individual; and in response to not receiving measurements indicative of signal strengths of one or more signals transmitted by a second transmitter associated with the second individual and intended to be received by the one or more receivers, generating, by the one or more processors, predetermined measurements indicative of signal strengths of the one or more signals transmitted by the second transmitter and intended to be received by the one or more receivers based on the one or more respective areas expected to be visited by the second individual.

In still yet another embodiment, the present invention is a computer-implemented method for adjusting the strengths of signals received from a transmitter based on the transmitter's likely location, comprising: receiving, by one or more processors, location information indicative of one of one or more respective areas expected to be visited by a first individual and one or more respective areas not expected to be visited by a second individual; receiving, by the one or more processors, measurements indicative of signal strengths of one or more signals transmitted by a first transmitter associated with the first individual and a second transmitter associated with the second individual and received by one or more receivers configured to receive one or more signals transmitted by the first transmitter and the second transmitter, the one or more receivers being positioned at respective receiver locations corresponding to one or more respective areas; and adjusting, by the one or more processors, the received measurements indicative of the signal strengths of the one or more signals transmitted by one of the first transmitter and the second transmitter based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

In a variation of this embodiment, adjusting the received measurements indicative of the signal strengths of the one or more signals transmitted by one of the first transmitter and the second transmitter includes: one of incrementally changing the received measurements by a third predetermined value based on the one or more respective areas expected to be visited by the first individual and multiplying the received measurements by a fourth predetermined value based on the one or more respective areas expected to be visited by the first individual when the first individual is present in the one or more respective areas expected to be visited by the first individual; or one of decrementally changing the received measurements by a fifth predetermined value based on the one or more respective areas not expected to be visited by the second individual and dividing the measurements by a sixth predetermined value based on the one or more respective areas not expected to be visited by the second individual when each of the first individual and the second individual is present in the one or more respective areas expected to be visited by the first individual.

For instance, each of the third, fourth, fifth and six predetermined values may be set by a user.

Moreover, in some examples, each of the third predetermined value and the fourth predetermined value may be determined based on historical measurements indicative of signal strengths received by the one or more receivers positioned at the respective receiver locations corresponding to the one or more respective areas expected to be visited by the first individual, and each of the fifth predetermined value and the sixth predetermined value may be determined based on historical measurements indicative of signal strengths received by the one or more receivers positioned at the respective receiver locations corresponding to the one or more respective areas not expected to be visited by the second individual.

In another embodiment, the present invention is a non-transitory computer-readable medium storing instructions for adjusting the strengths of signals received from a transmitter based on the transmitter's likely location that, when executed by one or more processors, cause the one or more processors to: receive location information corresponding to one or more respective areas expected to be visited by an individual; receive measurements indicative of signal strengths of one or more signals transmitted by a transmitter associated with the individual and received by one or more receivers configured to receive one or more signals transmitted by the transmitter, the one or more receivers being positioned at respective receiver locations corresponding to one or more respective areas; and adjust the received measurements indicative of the signal strengths of the one or more signals transmitted by the transmitter based on the one or more respective areas expected to be visited by the individual.

In a variation of this embodiment, the instructions further cause the one or more processors to identify an area associated with the individual based on the adjusted measurements.

Moreover, in a variation of this embodiment, wherein the instructions further cause the one or more processors to: receive timing information indicative of a range of time at which the identified area is expected to be visited by the individual, the range of time having a start time and a stop time; determine that the individual is visiting the identified area (i) prior to the start time, (ii) between the start time and the stop time, or (iii) after the stop time, of the range of time at which the identified area is expected to be visited by the individual; and based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

Furthermore, in a variation of this embodiment, the signals are one of radio frequency identification wireless signals and BLUETOOTH low energy (BLE) wireless signals.

Moreover, in a variation of this embodiment, adjusting the received measurements indicative of the signal strengths of the one or more signals transmitted by the transmitter may include one of: incrementally changing the received measurements by a first predetermined value based on the one or more respective areas expected to be visited by the individual, and multiplying the received measurements by a second predetermined value based on the one or more respective areas expected to be visited by the individual.

For instance, each of the first predetermined value and the second predetermined value is set by a user.

Moreover, in some examples, each of the first predetermined value and the second predetermined value may be determined based on historical measurements indicative of signal strengths received by the one or more receivers positioned at the respective receiver locations corresponding to the one or more respective areas expected to be visited by the individual.

Additionally, in a variation of this embodiment, the one or more respective areas include one or more respective rooms of a facility.

Furthermore, in a variation of this embodiment, the instructions further cause the one or more processors to: receive second location information indicative of one or more receiver locations corresponding to one or more respective areas expected to be visited by a second individual; and in response to not receiving measurements indicative of signal strengths of one or more signals transmitted by a second transmitter associated with the second individual and intended to be received by the one or more receivers, generate predetermined measurements indicative of signal strengths of the one or more signals transmitted by the second transmitter and intended to be received by the one or more receivers based on the one or more respective areas expected to be visited by the second individual.

In yet another embodiment, the present invention is a non-transitory computer-readable medium storing instructions for adjusting the strength of signals received from a transmitter based on the transmitter's likely location that, when executed by one or more processors, cause the one or more processors to: receive location information indicative of one of one or more respective areas expected to be visited by a first individual and one or more respective areas not expected to be visited by a second individual; receive measurements indicative of signal strengths of one or more signals transmitted by a first transmitter associated with the first individual and a second transmitter associated with the second individual and received by one or more receivers configured to receive one or more signals transmitted by the first transmitter and the second transmitter, the one or more receivers being positioned at respective receiver locations corresponding to one or more respective areas; and adjust the received measurements indicative of the signal strengths of the one or more signals transmitted by one of the first transmitter and the second transmitter based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

In a variation of this embodiment, the instructions causing the one or more processors to adjust the received measurements indicative of the signal strengths of the one or more signals transmitted by one of the first transmitter and the second transmitter include instructions that cause the one or more processors to: one of incrementally changing the received measurements by a third predetermined value based on the one or more respective areas expected to be visited by the first individual and multiplying the received measurements by a fourth predetermined value based on the one or more respective areas expected to be visited by the first individual when the first individual is present in the one or more respective areas expected to be visited by the first individual; or one of decrementally changing the received measurements by a fifth predetermined value based on the one or more respective areas not expected to be visited by the second individual and dividing the measurements by a sixth predetermined value based on the one or more respective areas not expected to be visited by the second individual when each of the first individual and the second individual is present in the one or more respective areas expected to be visited by the first individual.

For instance, each of the third, fourth, fifth and six predetermined values may be set by a user.

Moreover, in some examples, each of the third predetermined value and the fourth predetermined value may be determined based on historical measurements indicative of signal strengths received by the one or more receivers positioned at the respective receiver locations corresponding to the one or more respective areas expected to be visited by the first individual, and each of the fifth predetermined value and the sixth predetermined value may be determined based on historical measurements indicative of signal strengths received by the one or more receivers positioned at the respective receiver locations corresponding to the one or more respective areas not expected to be visited by the second individual.

In another embodiment, the present invention is a system for adjusting the size of a geo-fenced zone based on an individual's likely location, comprising: one or more processors; and a memory storing computer-readable instructions that, when executed by the one or more processors, cause the one or more processors to: determine one or more geo-fenced zones corresponding to one or more respective areas; receive location information indicative of the one or more areas expected to be visited by the individual, of the one or more respective areas; and adjust the one or more geo-fenced zones based on the one or more respective areas expected to be visited by the individual.

In a variation of this embodiment, the instructions, when executed by the one or more processors, further cause the one or more processors to: receive a measurement indicative of an estimated position of the individual; and identify an area associated with the individual based on comparing the estimated position of the individual to the adjusted one or more geo-fenced zones.

For instance, the instructions, when executed by the one or more processors, may further cause the one or more processors to: receive timing information indicative of a range of time at which the identified area is expected to be visited by the individual, the range of time having a start time and a stop time; determine that the individual is visiting the identified area (i) prior to the start time, (ii) between the start time and the stop time, or (iii) after the stop time, of the range of time at which the identified area is expected to be visited by the individual; and based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

Moreover, in a variation of this embodiment, the system may further include a transmitter associated with an individual; and one or more receivers configured to receive one or more signals transmitted by the transmitter, the one or more receivers being positioned at respective receiver locations corresponding to one or more respective areas; wherein the measurement is based on one or more signals transmitted by the transmitter and received by the one or more receivers.

For instance, the signals may be one of radio frequency identification wireless signals and BLUETOOTH low energy (BLE) wireless signals.

In a variation of this embodiment, each geo-fenced zone may be bound by x-y coordinates, and the estimated position of the individual may include x-y coordinates corresponding to the estimated position of the individual.

Furthermore, in a variation of this embodiment, causing the one or more processors to adjust the one or more geo-fenced zones based on the one or more respective areas expected to be visited by the individual includes one or more of: expanding the geo-fenced zones corresponding to the one or more respective areas expected to be visited by the individual by a first predetermined value, and contracting the geo-fenced zones corresponding to the one or more respective areas not expected to be visited by the individual by a second predetermined value.

For instance, each of the first predetermined value and the second predetermined value may be set by a user.

Moreover, in a variation of this embodiment, the one or more respective areas include one or more respective rooms of a facility.

In yet another embodiment, the present invention is a system for adjusting the size of multiple geo-fenced zones based on multiple individuals' likely locations, comprising: one or more processors; and a memory storing computer-readable instructions that, when executed by the one or more processors, cause the one or more processors to: determine one or more geo-fenced zones corresponding to one or more respective areas; receive location information indicative of at least one of one or more respective areas expected to be visited by a first individual and one or more respective areas not expected to be visited by a second individual; receive measurements indicative of signal strengths of one or more signals transmitted by a first transmitter associated with the first individual and a second transmitter associated with the second individual and received by the one or more receivers; and adjust the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

In still yet another embodiment, the present invention is a computer-implemented method for adjusting the size of a geo-fenced zone based on an individual's likely location, comprising: determining, by one or more processors, one or more geo-fenced zones corresponding to one or more respective areas; receiving, by the one or more processors, location information indicative of the one or more areas expected to be visited by the individual, of the one or more respective areas; and adjusting, by the one or more processors, the one or more geo-fenced zones based on the one or more respective areas expected to be visited by the individual.

In a variation of this embodiment, the method further includes receiving, by the one or more processors, a measurement indicative of an estimated position of the individual; and identify an area associated with the individual based on comparing the estimated position of the individual to the adjusted one or more geo-fenced zones.

For instance, the method may further include receiving, by the one or more processors, timing information indicative of a range of time at which the identified area is expected to be visited by the individual, the range of time having a start time and a stop time; determining that the individual is visiting the identified area (i) prior to the start time, (ii) between the start time and the stop time, or (iii) after the stop time, of the range of time at which the identified area is expected to be visited by the individual; and based on determining that the individual is visiting the identified area (i) prior to the start time, (ii) between the start time and the stop time, or (iii) after the stop time, of the range of time at which the identified area is expected to be visited by the individual, triggering, by the one or more processors, one or more actions related to the identified area.

Moreover, in a variation of this embodiment, the measurement is based on one or more signals transmitted by a transmitter associated with an individual and received by one or more receivers configured to receive one or more signals transmitted by the transmitter, the one or more receivers being positioned at respective receiver locations corresponding to one or more respective areas.

For instance, the signals may be one of radio frequency identification wireless signals and BLUETOOTH low energy (BLE) wireless signals.

In a variation of this embodiment, each geo-fenced zone may be bound by x-y coordinates, and the estimated position of the individual may include x-y coordinates corresponding to the estimated position of the individual.

Furthermore, in a variation of this embodiment, adjusting, by the one or more processors, the one or more geo-fenced zones based on the one or more respective areas expected to be visited by the individual includes one or more of: expanding the geo-fenced zones corresponding to the one or more respective areas expected to be visited by the individual by a first predetermined value, and contracting the geo-fenced zones corresponding to the one or more respective areas not expected to be visited by the individual by a second predetermined value.

For instance, each of the first predetermined value and the second predetermined value may be set by a user.

Moreover, in a variation of this embodiment, the one or more respective areas include one or more respective rooms of a facility.

In another embodiment, the present invention is a computer-implemented method for adjusting the size of multiple geo-fenced zones based on multiple individuals' likely locations, comprising: determining, by one or more processors, one or more geo-fenced zones corresponding to one or more respective areas; receiving, by the one or more processors, location information indicative of at least one of one or more respective areas expected to be visited by a first individual and one or more respective areas not expected to be visited by a second individual; receiving, by the one or more processors, measurements indicative of signal strengths of one or more signals transmitted by a first transmitter associated with the first individual and a second transmitter associated with the second individual and received by the one or more receivers; and adjusting, by the one or more processors, the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

In yet another embodiment, the present invention is a non-transitory computer-readable medium storing instructions for adjusting the size of a geo-fenced zone based on an individual's likely location that, when executed by one or more processors, cause the one or more processors to: determine one or more geo-fenced zones corresponding to one or more respective areas; receive location information indicative of the one or more areas expected to be visited by the individual, of the one or more respective areas; and adjust the one or more geo-fenced zones based on the one or more respective areas expected to be visited by the individual.

In a variation of this embodiment, the instructions, when executed by the one or more processors, further cause the one or more processors to: receive a measurement indicative of an estimated position of the individual; and identify an area associated with the individual based on comparing the estimated position of the individual to the adjusted one or more geo-fenced zones.

For instance, the instructions, when executed by the one or more processors, may further cause the one or more processors to: receive timing information indicative of a range of time at which the identified area is expected to be visited by the individual, the range of time having a start time and a stop time; determine that the individual is visiting the identified area (i) prior to the start time, (ii) between the start time and the stop time, or (iii) after the stop time, of the range of time at which the identified area is expected to be visited by the individual; and based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

Moreover, in a variation of this embodiment, the measurement is based on one or more signals transmitted by a transmitter associated with an individual and received by one or more receivers configured to receive one or more signals transmitted by the transmitter, the one or more receivers being positioned at respective receiver locations corresponding to one or more respective areas.

For instance, the signals may be one of radio frequency identification wireless signals and BLUETOOTH low energy (BLE) wireless signals.

In a variation of this embodiment, each geo-fenced zone may be bound by x-y coordinates, and the estimated position of the individual may include x-y coordinates corresponding to the estimated position of the individual.

Furthermore, in a variation of this embodiment, causing the one or more processors to adjust the one or more geo-fenced zones based on the one or more respective areas expected to be visited by the individual includes one or more of: expanding the geo-fenced zones corresponding to the one or more respective areas expected to be visited by the individual by a first predetermined value, and contracting the geo-fenced zones corresponding to the one or more respective areas not expected to be visited by the individual by a second predetermined value.

For instance, each of the first predetermined value and the second predetermined value may be set by a user.

Moreover, in a variation of this embodiment, the one or more respective areas include one or more respective rooms of a facility.

In yet another embodiment, the present invention is a non-transitory computer-readable medium storing instructions for adjusting the size of multiple geo-fenced zones based on multiple individuals' likely locations that, when executed by one or more processors, cause the one or more processors to: determine one or more geo-fenced zones corresponding to one or more respective areas; receive location information indicative of at least one of one or more respective areas expected to be visited by a first individual and one or more respective areas not expected to be visited by a second individual; receive measurements indicative of signal strengths of one or more signals transmitted by a first transmitter associated with the first individual and a second transmitter associated with the second individual and received by the one or more receivers; and adjust the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a table illustrating adjusted RSSI values associated with the first transmitter during the experiment discussed with respect to FIG. 1.

FIG. 5 is a table illustrating adjusted RSSI values associated with the second transmitter during the experiment discussed with respect to FIG. 1.

Figure 1:
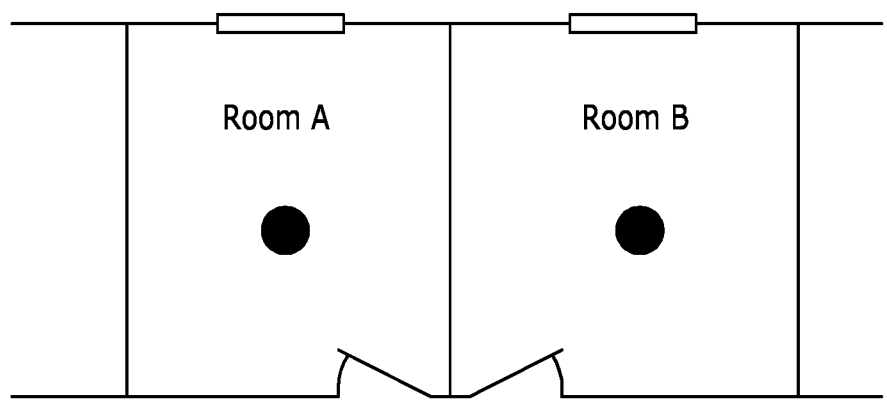
FIG. 1 illustrates an example of two adjacent rooms in which an experiment was performed in order to determine the accuracy of identifying transmitters in each room based on the strengths of the transmitter signals as received by signal receivers in each room.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, the techniques provided herein involve adjusting the strengths of signals received from transmitters based on likely locations of the transmitters and/or adjusting the sizes of geo-fenced areas based on likely locations of individuals. Using known locations that an individual associated with a transmitter is likely to visit, the signal strengths and/or geofenced zones associated with these locations may be increased, and/or locations that the individual associated with the transmitter is unlikely to visit may be decreased, in order to introduce a bias towards likely locations. In environments such as hospitals, where patients are likely to only visit a few different rooms (e.g., the room in which the patient is staying, several common rooms, and/or particular treatment or diagnostic rooms), the techniques provided herein allow for improved accuracy in determining which of the rooms the patient is visiting at a given time. Advantageously, accurately measuring room usage in this manner will allow hospitals to monitor for anomalies and issue alerts to enhance outcomes regarding patient moves for timeliness and correct destinations further enhancing communications, transfer rates, and the amount of time spent with patients.

For example, FIG. 1 is an illustration of two adjacent rooms ("Room A" and "Room B") in which an experiment was performed in order to determine the accuracy of identifying transmitters (also called "tags") in each room based on the strengths of the transmitter signals as received by signal receivers (also called "gateways") in each room.

Figure 2:
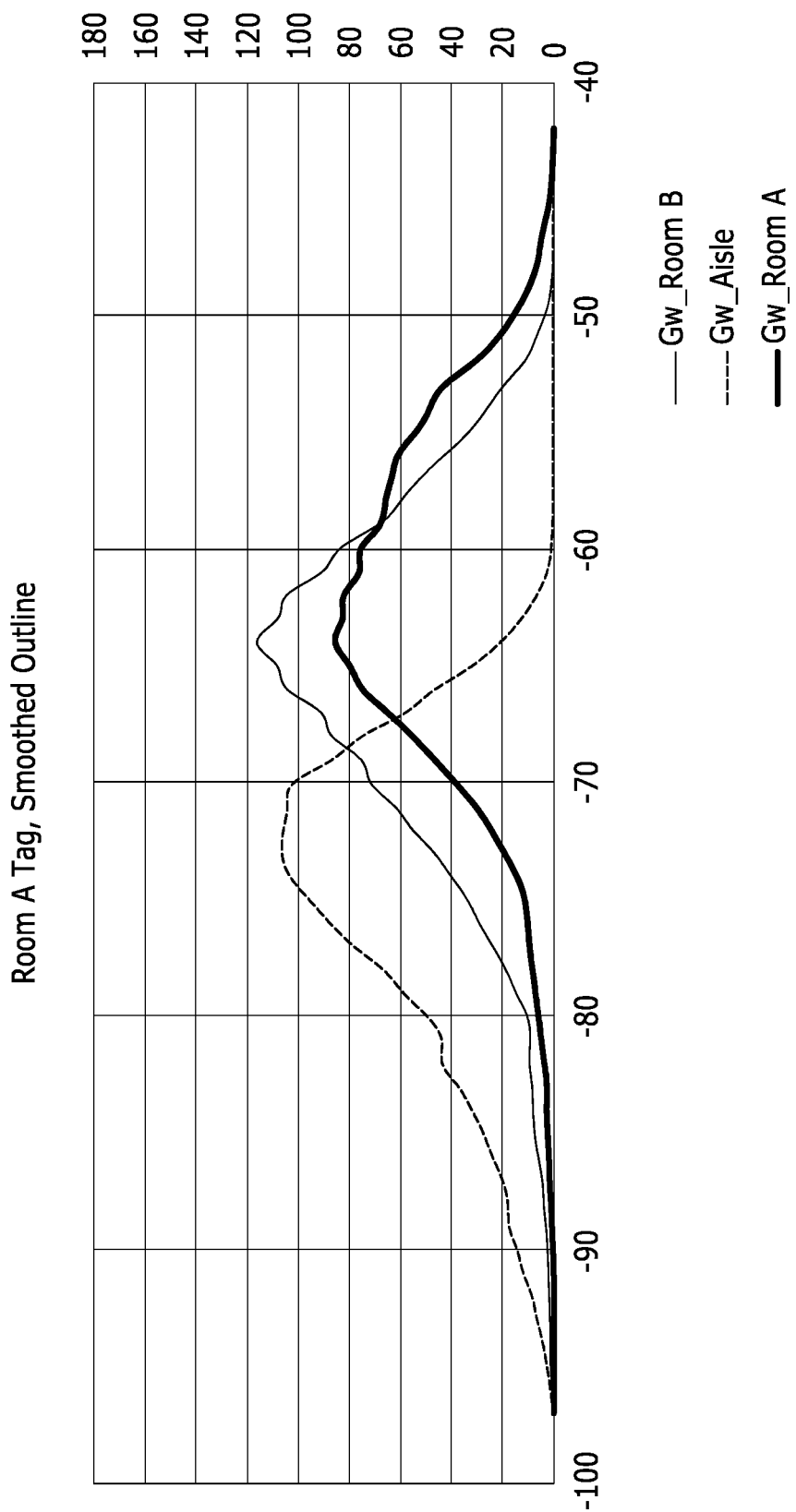
FIG. 2 illustrates the RSSI values associated with a first transmitter during the experiment discussed with respect to FIG. 1.

The graph shown at FIG. 2 illustrates the RSSI values associated with the Room A tag during the experiment. As shown at FIG. 2, the Room A gateway had an average RSSI of −62 from the Room A tag and the Room B gateway had an average RSSI of −66 from the Room A tag. This small separation in RSSI values, with substantial overlap between the two curves, results in very poor locationing performance.

Figure 3:
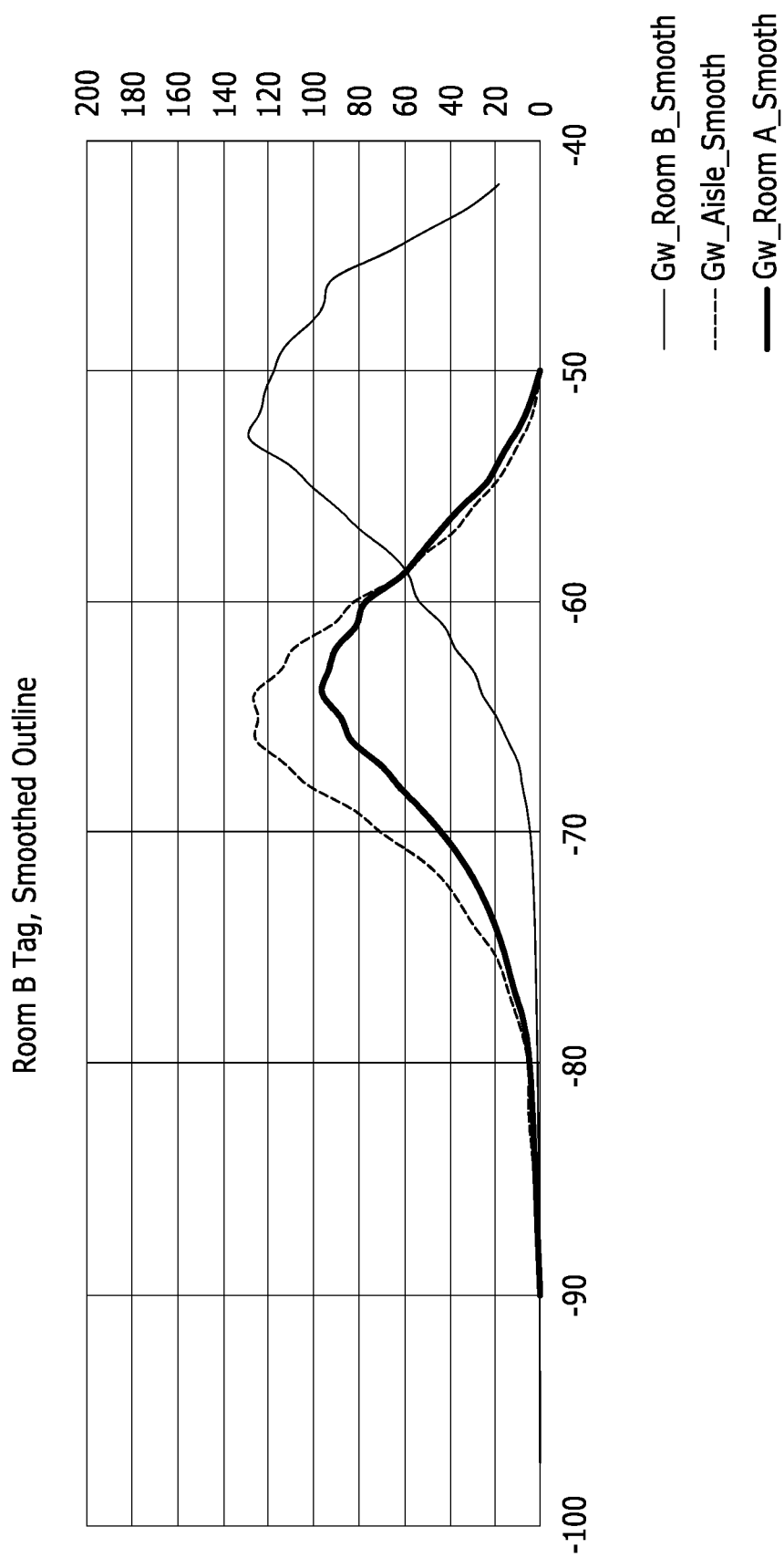
FIG. 3 illustrates the RSSI values associated with a second transmitter during the experiment discussed with respect to FIG. 1.

The graph shown at FIG. 3 illustrates the RSSI values associated with the Room B tag during the experiment. As shown at FIG. 3, the Room A gateway had an average RSSI of −64 from the Room B tag and the Room B gateway had an average RSSI of −53 from the Room B tag. This greater separation in RSSI values makes for improved locationing performance, with significantly decreased overlap compared to the graph shown at FIG. 2.

FIG. 4 illustrates example adjustments that could be made to the RSSI values shown at FIG. 2 based on marking the Room A tag as likely to be located in Room A, such that Room A's RSSI values are boosted from their original values. There were a total of 728 seconds where the Room A tag had readings from both gateways. Without correction, the Room A gateway's RSSI from the Room A tag was higher than the Room B gateway's RSSI from the Room A tag only 66% of the time, despite the fact that the Room A tag was located in Room A. With correction, the Room A gateway's RSSI from the server room tag was higher than the Room B gateway's RSSI from the Room A tag 84%-99% of the time, depending on the degree of correction.

FIG. 5 illustrates example adjustments that could be made to the RSSI values shown at FIG. 3 based on marking the Room B tag as likely to be located in Room B, such that the Room B's RSSI values are boosted from their original values. There were a total of 728 seconds where the Room A tag had readings from both gateways. Without correction, the Room B gateway's RSSI from the conference room's tag was higher than the Room A gateway's RSSI from the Room A tag 95% of the time, and with correction the Room B gateway's RSSI from Room B's tag was higher than the Room A's RSSI from Room B's tag closer to 100% of the time, depending on the degree of correction.

Figure 6:
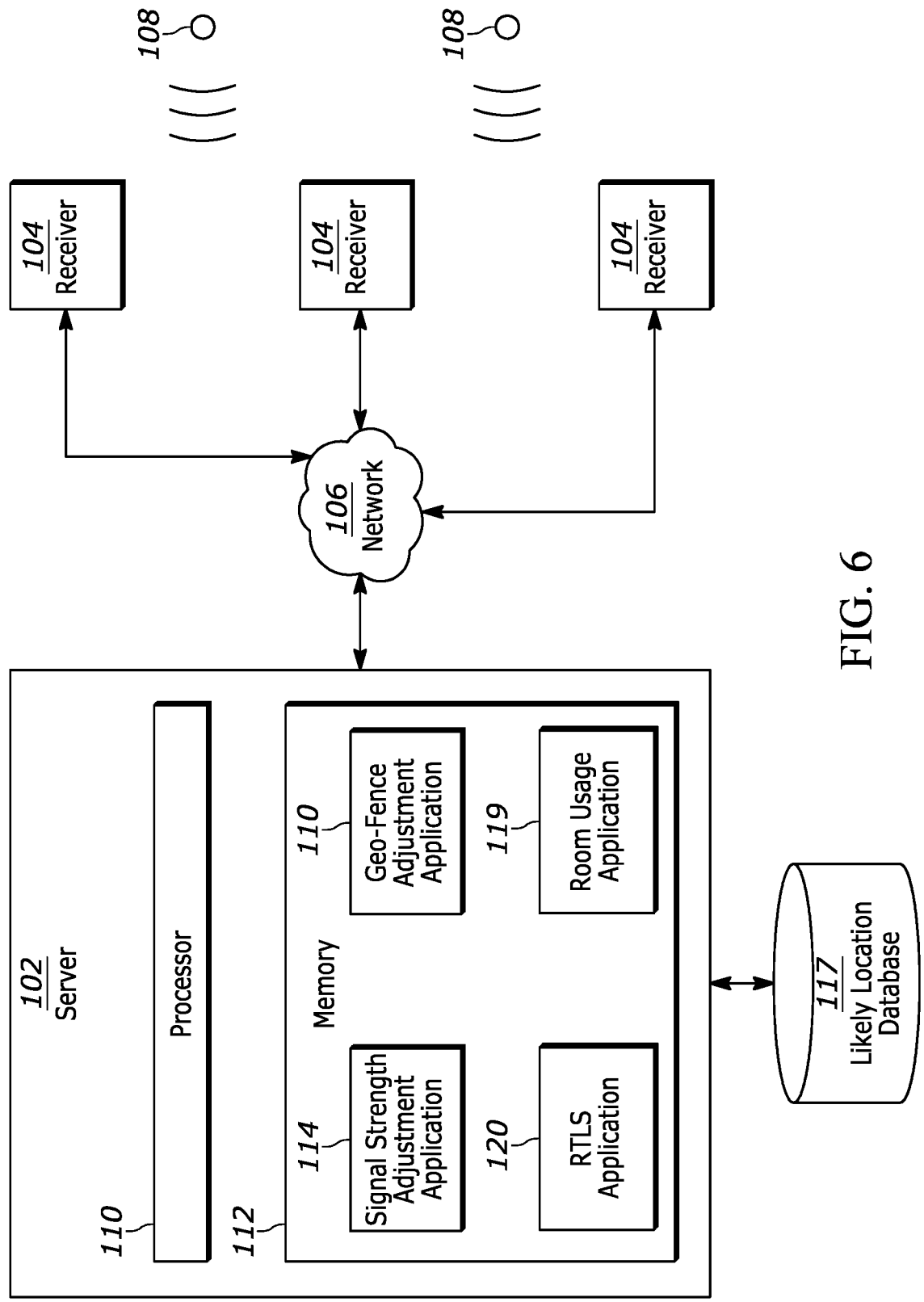
FIG. 6 illustrates an example system for adjusting the strengths of signals received from transmitters based on the transmitters' likely locations and/or adjusting the sizes of geo-fenced areas based on likely locations of individuals, where embodiments of the present invention may be implemented.

FIG. 6 illustrates an example system 100 for adjusting the strengths of signals received from transmitters (or transceivers) based on likely locations of the transmitters (or transceivers) and/or adjusting the sizes of geo-fenced areas based on likely locations of individuals.

In the illustrated example, the system 100 includes a server 102, which may communicate with a plurality of receivers 104 (e.g., wireless gateways, and as a note, "receivers" as discussed herein may include transceivers) via a network 106 (and/or via a wired interface, not shown). The receivers 104 may include a network interface (not shown) that represents any suitable type of communication interface(s) (e.g., wired interfaces such as Ethernet or USB, and/or any suitable wireless interfaces) configured to operate in accordance with any suitable protocol(s) for communicating with the server 102 over the network 106. The receivers 104 may be positioned at various positions within a facility (e.g., a hospital facility), and may be configured to receive signals, such as radio frequency identification wireless signals and/or BLUETOOTH low energy (BLE) wireless signals, transmitted by transmitters 108 (as a note, "transmitters" as discussed herein may include transceivers). Each transmitter 108 may be associated with a particular individual, and the transmitters 108 may be worn by, carried by, or otherwise associated with respective individuals in the facility. For instance, individuals may wear respective transmitters 108 on wristbands or lanyards provided by the facility, or may carry mobile devices such as smart phones, tablets, etc., that include transmitters 108.

The server 102 may include one or more processors 110, which may be, for example, one or more microprocessors, controllers, and/or any suitable type of processors, and a memory 112 accessible by the one or more processors 110 (e.g., via a memory controller). An example processor 110 may interact with the memory 112 to obtain, for example, machine-readable instructions stored in the memory 112 corresponding to, for example, the operations represented by the flowcharts of this disclosure, including those of FIG. 10, FIG. 11, FIG. 12, FIG. 13 and/or FIG. 14. For instance, the instructions stored in the memory 112, when executed by the processor 110, may cause the processor 110 to execute various applications stored in the memory 112, such as a signal strength adjustment application 114, a geo-fence adjustment application 116, a room usage application 119, and/or a real-time locationing system (RTLS) application 120.

Generally speaking, executing the RTLS application 120 may include analyzing the RSSIs of signals from the transmitters 108, as received by the receivers 104, in order to generate respective estimated positions associated with each of the transmitters 108 (e.g., x-y coordinates associated with each of the transmitters 108). In some examples, the RTLS application may receive adjusted signal strengths from the signal strength adjustment application 114 (discussed in greater detail below) and may generate at least some of the estimated positions associated with the transmitters 108 based on the adjusted signal strengths.

Generally speaking, executing the signal strength adjustment application 114 may include receiving location information corresponding to respective areas expected to be visited by an individual, receiving measurements indicative of signal strengths of signals transmitted by the transmitters 108 and received by the receivers 104, and adjusting the measurements indicative of the signal strengths of the signals transmitted by the transmitters 108 based on the respective areas expected to be visited by individuals associated with the transmitters 108.

Figure 7:
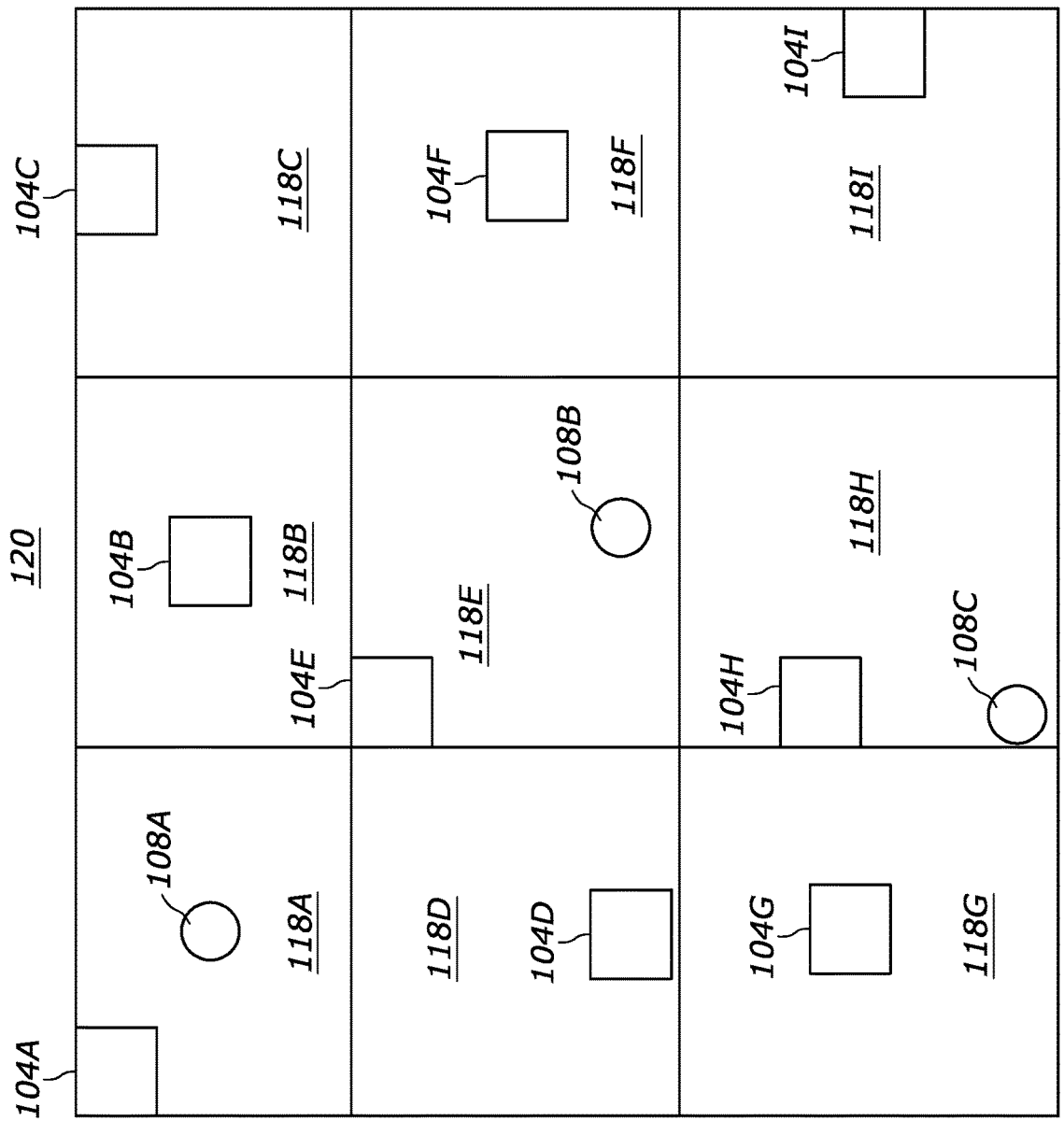
FIG. 7 illustrates an example facility including various rooms, with receivers located in each of the various rooms and several transmitters located in particular rooms of the facility.

For instance, FIG. 7 illustrates an example facility 120, including various rooms 118A-118I. Each room 118A-118I includes a respective receiver 104A-104I. Three transmitters 108A, 108B, and 108C, associated with three respective individuals (e.g., Alice, Bob, and Charlie), are located in the facility 120, with Alice and her associated transmitter 108A located in room 118A, Bob and his associated transmitter 108B located in room 118E, and Charlie and his associated transmitter 108C located in room 118H. The signal strength adjustment application 114 may receive or retrieve likely locations of the individuals, e.g., from an likely location database 117 (which may pull from, for instance, electronic medical records associated with the individuals). There may be a single likely location for each individual (e.g., a hospital room where the individual's bed is located), or there may be multiple likely locations for each individual (e.g., a hospital room where the individual's bed is located, a room where surgery will be performed, a room where an x-ray on the individual will be performed, etc.). When there are multiple likely locations for each individual, there may also be expected ranges of dates/times at which the individual is expected to be in each of the locations.

The signal strength adjustment application 114 may receive measurements, made by the receivers 104A-104I, of the strengths of the signals from each of the transmitters 108A-108C. For example, each of the receivers 104A-104I may measure respective signal strengths originating from each of the transmitters 108A-108C. The signal strengths originating from each of the transmitters 108A-108C, as received by each of the receivers 104A-104I, may be adjusted based on whether the individual associated with the transmitter 108A-108C is expected to visit the room 118A-118I in which each of the receiver 104A-104I is positioned.

For example, if Alice is expected to be in room 118A all day, the strength of the signals received by the receiver 104A (located in room 118A) from the transmitter 108A (associated with Alice), may be increased. Similarly, the strengths of the signals received by the other receivers 104B-104I, located in rooms that Alice is not expected to visit, may be decreased.

Similarly, if Bob is expected to visit room 118C during a first period of time, and is expected to visit room 118E during a second period of time, the strength of the signals received by the receiver 104C (located in room 118C) from the transmitter 108B (associated with Bob) during the first period of time, may be increased, while the strengths of the signals received by the other receivers 104A, 104B, and 104D-104I, located in rooms that Bob is not expected to visit during the first period of time, may be decreased. Moreover, the strength of the signals received by the receiver 104E (located in room 118E) from the transmitter 108B (associated with Bob) during the second period of time, may be increased, while the strengths of the signals received by the other receivers 104A-104D, and 104E-104I, located in rooms that Bob is not expected to visit during the second period of time, may be decreased.

As another example, if Charlie is expected to move freely between rooms 118H and 118D during his stay, the strength of signals received by the receiver 104H (located in room 118H) and the receiver 104D (located in room 118D) from the transmitter 108C (associated with Charlie) may be increased, while the strengths of the signals received by the other receivers 104A-104C, 104E-104G, and 104I, located in rooms that Charlie is not expected to visit during his stay, may be decreased.

The signal strength adjustment application 114 may use these the adjusted signal strengths to identify a location associated with the individual who is wearing or carrying the transmitter. For example, the signal strength adjustment application 114 may determine that Alice is located in room 118A based on the adjusted signal strength of the signal from the transmitter 108A, as received by the receiver 104A associated with the room 118A, being stronger than the adjusted signal strength of the signal from the transmitter 108A as received by any of the other receivers 104B-104I associated with the other rooms 118B-118I.

The signal strength adjustment application 114 may send these adjusted signal strengths to the RTLS application 120 for further processing and determination of positions of the various transmitters 108.

Executing the geo-fence adjustment application 116 may include determining geo-fenced zones corresponding to one or more respective areas, receiving location information indicative of one or more areas expected to be visited by an individual, and adjusting the sizes of the geo-fenced zones based on the one or more areas expected to be visited by the individual. The geo-fence adjustment application 116 may determine or receive an estimated location associated with the individual (e.g., from the RTLS application 120), and may compare the estimated location of the individual to the adjusted geo-fenced zones in order to determine an associated area where the individual is located. The geo-fenced zones may be adjusted on an individual basis, i.e., such that one individual's estimated location is compared to a first set of adjusted geo-fenced zones and another individual's estimated location is compared to a second set of adjusted geo-fenced zones.

Figure 8:
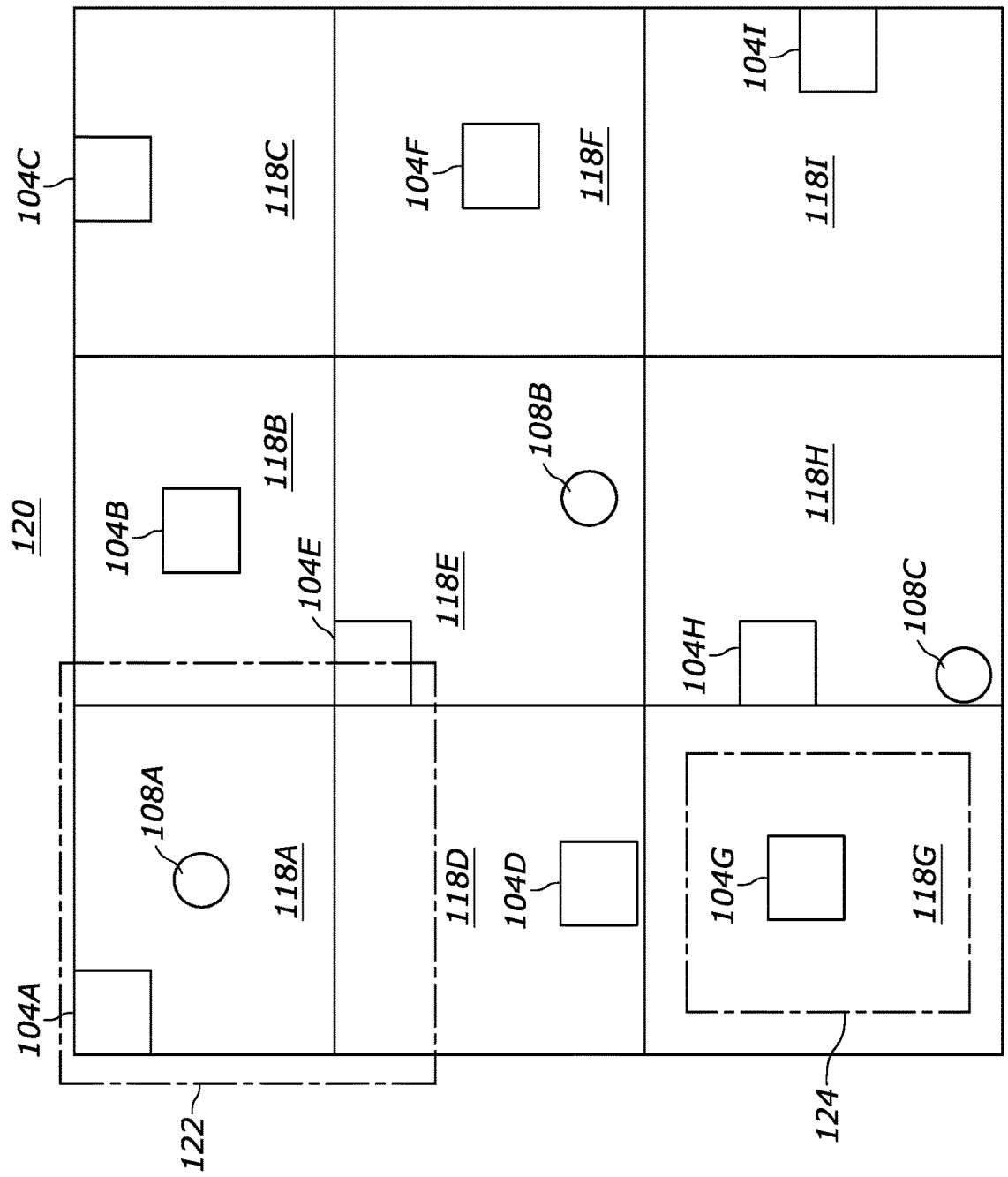
FIG. 8 illustrates the example facility of FIG. 7, adjusted to include an expanded geo-fenced zone for one room of the facility and a contracted geo-fenced zone for another room of the facility.

For instance, as shown at FIG. 7, an initial geo-fenced zone may be associated with each of the rooms 118A-118I of the facility 120. For example, each geo-fenced zone may include x-y coordinates corresponding to the x-y coordinates of each respective room 118A-118I. The geo-fence adjustment application 116 may receive estimated locations associated with various individuals, such as Alice, Bob, and Charlie as discussed above. The locations associated with the individuals may be estimated based on the signal strengths of transmitters 108A-108C associated with each individual as received by the receivers 104A-104I, as discussed above in some examples. In other examples, however, the locations associated with the individuals may be estimated based on other signals associated with the individuals. In any case, however, geo-fenced zones associated with rooms that an individual is expected to visit may be expanded, while geo-fenced zones associated with rooms that the individual is not expected to visit may be contracted. For example, FIG. 8 illustrates the facility 120 of FIG. 7, with an example expanded geo-fence for room 118A and an example contracted geo-fence for room 118G. Generally speaking, when a geo-fence is expanded, neighboring geo-fences (e.g., geo-fences for adjacent rooms) may correspondingly be contracted. Similarly, when a geo-fence is contracted, neighboring geo-fences may correspondingly be expanded.

For instance, using a similar example as discussed above with respect to the signal strength adjustment application 114, if Alice is expected to be in room 118A all day, the geo-fenced zone associated with the room 118A that Alice is expected to visit may be expanded, and/or the geo-fenced zones associated with the other rooms 118B-118I, that Alice is not expected to visit may be contracted. Alice's estimated location may then be compared to the Alice-specific adjusted set of geo-fenced zones in order to determine the room where Alice is located.

Similarly, if Bob is expected to visit room 118C during a first period of time, and is expected to visit room 118E during a second period of time, the geo-fenced zone associated with room 118C may be expanded during the first period of time, and/or the geo-fenced zones associated with the other rooms 118A, 118B, and 118D-118I, located in rooms that Bob is not expected to visit during the first period of time, may be contracted. Moreover, the geo-fenced zone associated with room 118E may be expanded during the second period of time, and/or the geo-fenced zones associated with the other rooms 118A-118D, and 118E-118I, located in rooms that Bob is not expected to visit during the second period of time, may be contracted. Bob's estimated location may then be compared to the Bob-specific adjusted set of geo-fenced zones in order to determine the room where Bob is located.

As another example, if Charlie is expected to move freely between rooms 118H and 118D during his stay, the geo-fenced zones associated with room 118H and room 118D may be expanded, while the geo-fenced zones associated with the rooms 118A-118C, 118E-118G, and 118I, located in rooms that Charlie is not expected to visit during his stay, may be contracted. Charlie's estimated location may then be compared to the Charlie-specific adjusted set of geo-fenced zones in order to determine the room where Charlie is located.

Executing the room usage application 119 may include obtaining a recorded sequence of planned locations throughout the patient care pathway determined in advance, including, e.g., a destination, departure time, and arrival time, e.g., from the database 117. The room usage application 119 may monitor the patient room locations, as determined by the signal strength adjustment application 114 and the geo-fenced zone adjustment application 116 for anomalies regarding patient moves for timeliness and correct destinations.

The room usage application 119 may define room usage with the following truth table:

$$\text{Room Usage} = (\text{Location}_{Reported} \wedge \text{Location}_{A\ priori}) \wedge \text{Time}_{Location}$$

TABLE 1

Truth table for Room Usage.

| Location$_{Reported}$ | Location$_{A\_Priori}$ | Time$_{Location}$ | Room Usage |
|---|---|---|---|
| 0 | 0 | 0 | False |
| 1 | 0 | 0 | False |
| 0 | 1 | 1 | False |
| 1 | 1 | 1 | True |
| 1 | 1 | 0 | False |

The room usage application 119 may translate time into a Boolean signal to signify when a patient is or is not scheduled to occupy a location. Time is True when a patient is scheduled to reside at a location between a start and end time. Time is False when the patient is not scheduled to reside at a location. For Room Usage to be True, Location Reported and Location A Priori must match at the scheduled time. If the patient arrives but waits in the hallway outside the room, Room Usage will be False since it is outside the scheduled room occupancy time. When a move starts, Location A Priori will be set to the new destination. Hence, when arriving early (LocationReported^Location A Priori) will be True so it is clear the patient is at or near the desired location. Given the propagation characteristics of BLE signaling, the bridge will most likely detect the tag in the hallway. Conversely, if the patient is delayed from being moved out of a room, Room Usage will be False since Location A Priori will be set to the next location and TimeLocation will be False.

Figure 9:
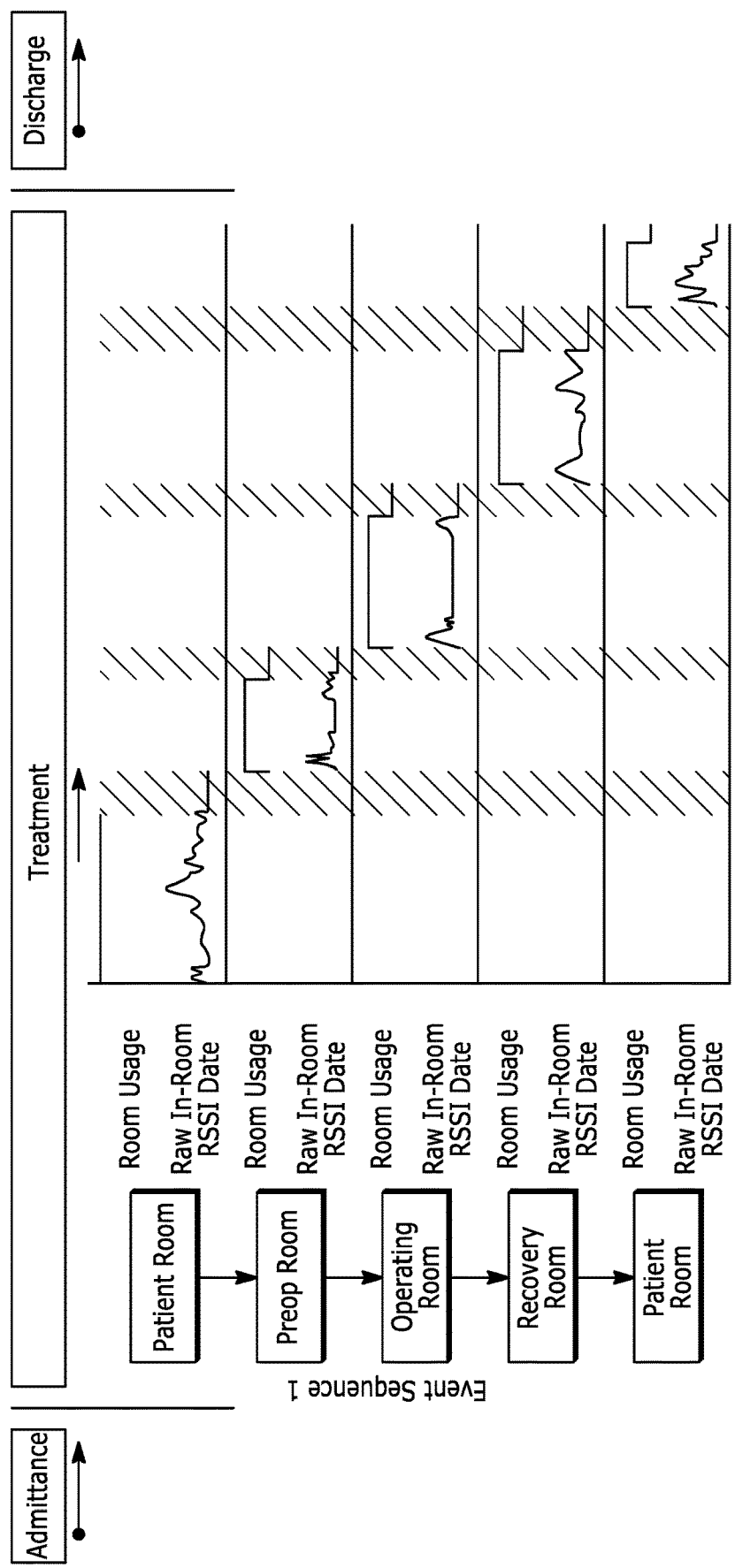
FIG. 9 illustrates an example event sequence for an operating room of a hospital facility.
Figure 10:
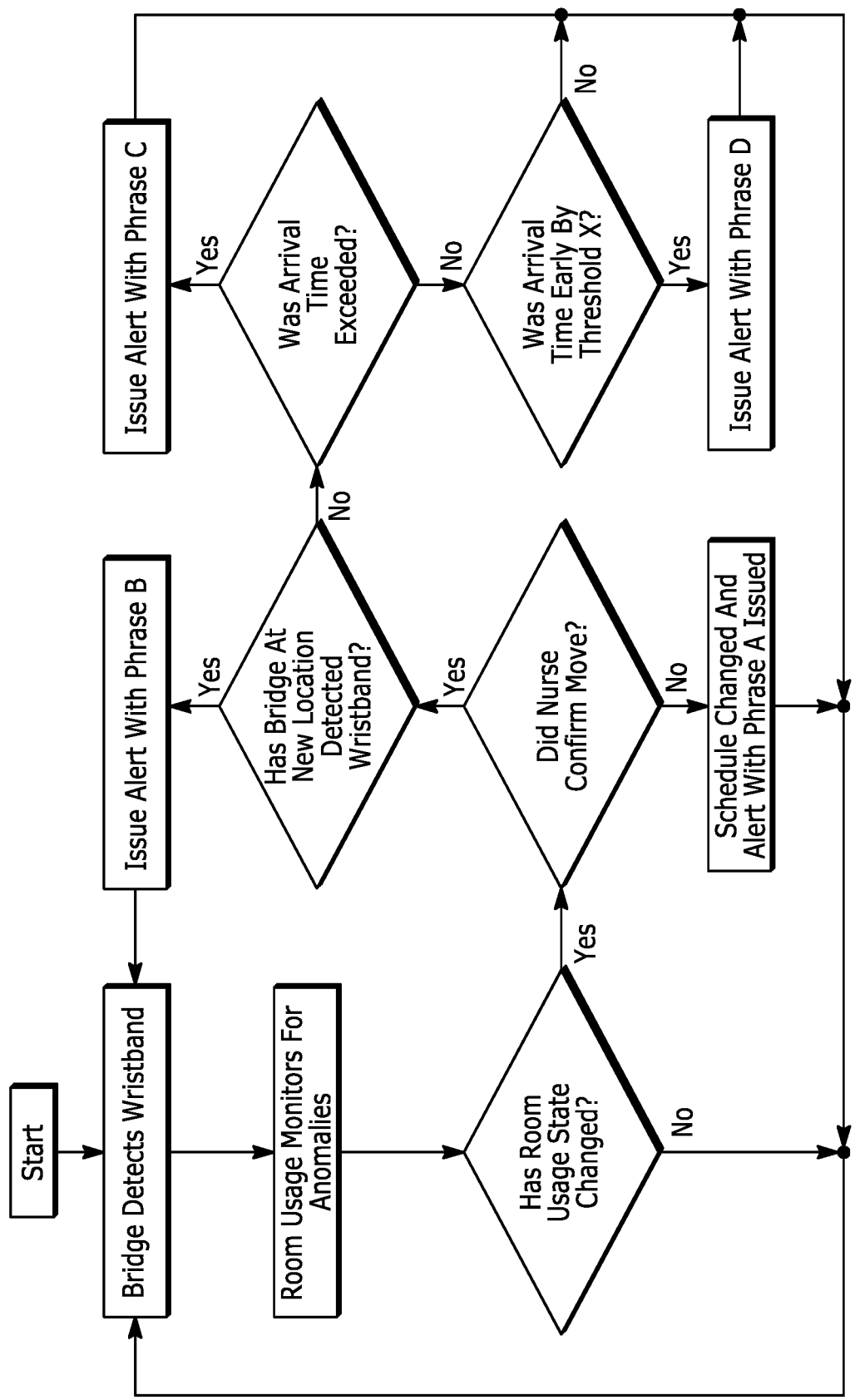
FIG. 10 illustrates a block diagram of an example process as may be implemented by the system of FIG. 6, for implementing example methods and/or operations described herein including techniques for executing a room usage application, as may be performed by the system of FIG. 6.

For instance, FIG. 9 illustrates an event sequence central to the operating room orchestration (the most expensive room the patient will occupy during the example event sequence). It is also worth noting that the same framework may be applicable to the emergency department orchestration. As the patient dwells at each location, the patient wristband is detected by the co-located bridge and the RSSI location telemetry is collected, and the room usage application 119 may monitor for anomalies. For instance, FIG. 10 illustrates a flow diagram of steps that may be performed by the room usage application 119.

The start of an event sequence is activated by an assigned task, such as, from clinical workflows, EHR, or Reflexis workforce management software to move the patient or by the dwell time in a room expiring or the Location A Priori changing to the next destination. Generally speaking, the shaded regions of FIG. 9 indicate when a patient is in transition between locations, e.g., at departure and arrival times. Within these shaded regions, room usage, as determined by the room usage application 119, will be false since the patient is not in a room.

The room usage application 119 may further determine related key performance indicators (KPIs), such as dwell time of nurses or time between nurse visits. For example, if a procedure in an operating room does not finish as scheduled, and (a) it is late then an alert with Phrase A is issued or (b) it is sufficiently early by (e.g., early by a pre-defined threshold amount of time), then an alert with Phrase D is issued. For instance, the room usage application 119 may generate a visibility dashboard showing scheduled use of the operating room in real-time with any requisite changes and updates. If the procedure finishes sufficiently early, for instance, the schedule for the next procedure using the same room may be moved up to ensure the operating room does not go idle and incur unwarranted expenses.

Moreover, in some examples, additional or alternative applications may be included in various embodiments. Additionally or alternatively, machine-readable instructions corresponding to the example operations described herein may be stored on one or more removable media (e.g., a compact disc, a digital versatile disc, removable flash memory, etc.) that may be coupled to the server 102 to provide access to the machine-readable instructions stored thereon.

Figure 11:
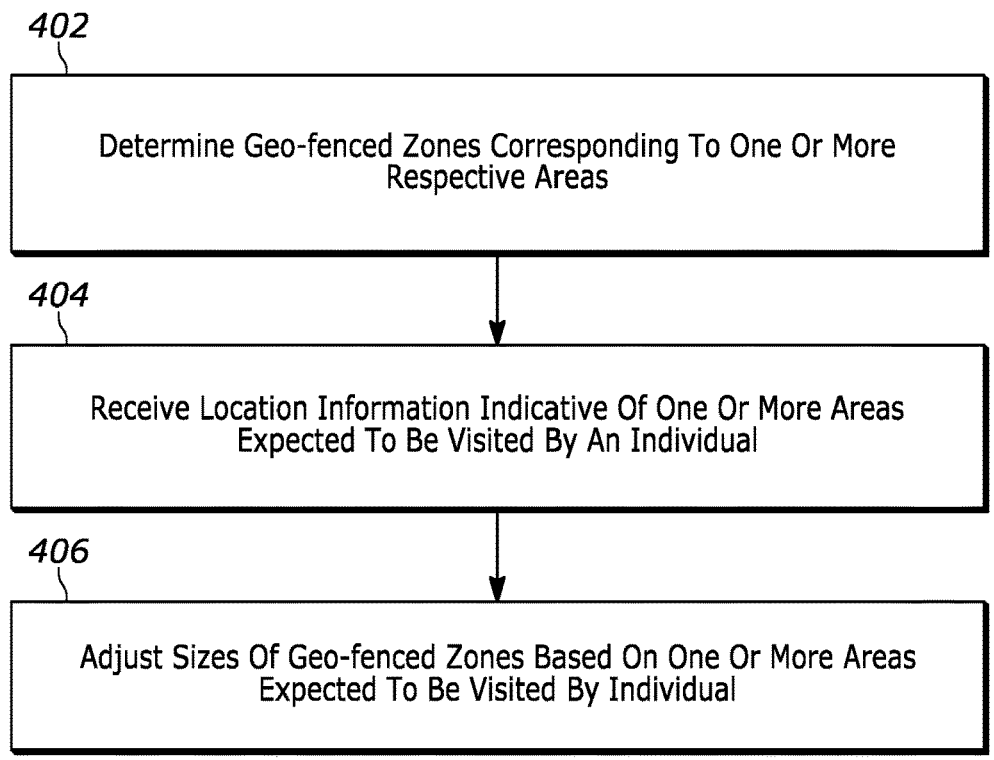
FIG. 11 illustrates a block diagram of an example process as may be implemented by the system of FIG. 6, for implementing example methods and/or operations described herein including techniques for adjusting the strengths of signals received from a transmitter based on the transmitter's likely location, as may be performed by the system of FIG. 6.

FIG. 11 illustrates a block diagram of an example process 200 as may be implemented by the logic circuit of FIG. 6, for implementing example methods and/or operations described herein including techniques for adjusting the strengths of signals received from a transmitter based on the transmitter's likely location, as may be performed by the system 100 of FIG. 6.

At block 202, location information corresponding to one or more respective areas expected to be visited by an individual may be received. For instance, the areas expected to be visited by the individual may be various rooms of a facility (e.g., a hospital facility). In some examples, location information related to multiple individuals may be received, e.g., including location information corresponding to one or more respective areas expected to be visited by a first individual, one or more respective areas expected to be visited by a second individual, one or more respective areas expected to be visited by a third individual, etc.

At block 204, measurements may be received, indicative of signal strengths of one or more signals transmitted by a transmitter associated with the individual and received by one or more receivers configured to receive one or more signals transmitted by the transmitter. For instance, the signals may be, e.g., radio frequency identification wireless signals and/or BLUETOOTH low energy (BLE) wireless signals. In particular, the one or more receivers may be positioned at respective receiver locations corresponding to one or more respective areas.

At block 206, the received measurements indicative of the signal strengths of the one or more signals transmitted by the transmitter may be adjusted based on the one or more respective areas expected to be visited by the individual. In some examples, the method 200 may include identifying an area associated with the individual based on the adjusted measurements.

For example, adjusting the received measurements indicative of the signal strengths of the one or more signals transmitted by the transmitter may include incrementally changing the received measurements by a first predetermined value based on the one or more respective areas expected to be visited by the individual. Additionally, or alternatively, adjusting the received measurements indicative of the signal strengths of the one or more signals transmitted by the transmitter may include multiplying the received measurements by a second predetermined value based on the one or more respective areas expected to be visited by the individual. The first and/or second predetermined value may be set by a user in some examples. Moreover, in some examples, the first predetermined value and/or the second predetermined value may be determined based on historical measurements indicative of signal strengths received by the one or more receivers positioned at the respective receiver locations corresponding to the one or more respective areas expected to be visited by the individual.

In some examples, the method 200 may include generating predetermined measurements indicative of signal strengths of the one or more signals transmitted by the transmitter and intended to be received by the one or more receivers based on the one or more respective areas expected to be visited by the individual, in response to failing to receiving measurements indicative of signal strengths of one or more signals transmitted by the transmitter associated with the individual and intended to be received by the one or more receivers.

Moreover, in some examples, the method 200 may include receiving timing information indicative of a range of time at which the identified area is expected to be visited by the individual. For instance, the range of time may have a start time and a stop time. A determination may be made as to whether the area identified as being associated with the individual is or was visited prior to the start time, between the start time and the stop time, or after the stop time. Based on this determination, one or more actions related to the identified area may be triggered.

Figure 12:
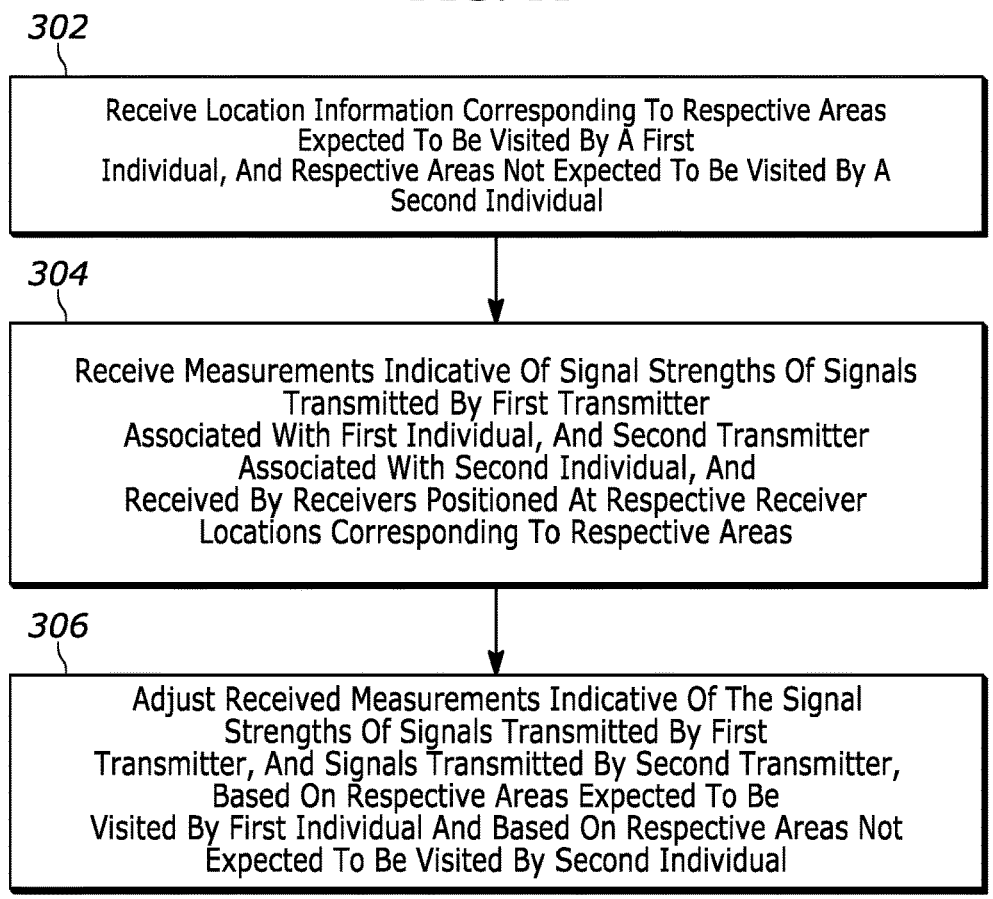
FIG. 12 illustrates a block diagram of another example process as may be implemented by the system of FIG. 6, for implementing example methods and/or operations described herein including techniques for adjusting the strengths of signals received from multiple transmitters based on the transmitters' likely locations, as may be performed by the system of FIG. 6.

FIG. 12 illustrates a block diagram of an example process 300 as may be implemented by the logic circuit of FIG. 6, for implementing example methods and/or operations described herein including techniques for adjusting the strengths of signals received from multiple transmitters based on the transmitters' likely locations, as may be performed by the system 100 in FIG. 6.

At block 302, location information indicative of one of one or more respective areas expected to be visited by a first individual and one or more respective areas not expected to be visited by a second individual may be received. For instance, the one or more respective areas expected to be visited by the first individual may include the one or more respective areas not expected to be visited by the second individual. The areas expected to be visited by the first individual and/or the second individual may be various rooms of a facility (e.g., a hospital facility).

At block 304, measurements may be received, indicative of signal strengths of one or more signals transmitted by a first transmitter associated with the first individual and a second transmitter associated with the second individual and received by one or more receivers configured to receive one or more signals transmitted by the first transmitter and the second transmitter. For instance, the signals may be, e.g., radio frequency identification wireless signals and/or BLUETOOTH low energy (BLE) wireless signals. In particular, the one or more receivers may be positioned at respective receiver locations corresponding to one or more respective areas.

At block 306, the received measurements indicative of the signal strengths of the one or more signals transmitted by one of the first transmitter and the second transmitter may be adjusted based on one of the one or more respective areas expected to be visited by the first individual and the one or more respective areas not expected to be visited by the second individual. In some examples, the method 300 may include identifying areas associated with the first individual and/or the second individual based on the adjusted measurements.

For example, adjusting the measurements indicative of the signal strengths of the one or more signals transmitted by one of the first transmitter and the second transmitter may include incrementally changing the received measurements by a third predetermined value based on the one or more respective areas expected to be visited by the first individual. Additionally, or alternatively, adjusting the measurements indicative of the signal strengths of the one or more signals transmitted by one of the first transmitter and the second transmitter may include multiplying the received measurements by a fourth predetermined value based on the one or more respective areas expected to be visited by the first individual when the first individual is present in the one or more respective areas expected to be visited by the first individual. Additionally or alternatively, for example, adjusting the measurements indicative of the signal strengths of the one or more signals transmitted by one of the first transmitter and the second transmitter may include decrementally changing the received measurements by a fifth predetermined value based on the one or more respective areas not expected to be visited by the second individual. As still another example, additionally or alternatively, adjusting the measurements indicative of the signal strengths of the one or more signals transmitted by one of the first transmitter and the second transmitter may include dividing the measurements by a sixth predetermined value based on the one or more respective areas not expected to be visited by the second individual when each of the first individual and the second individual is present in the one or more respective areas expected to be visited by the first individual. The third, fourth, fifth, and/or sixth predetermined values may be set by a user in some examples. Moreover, in some examples, the third predetermined value and/or the fourth predetermined value may be determined based on historical measurements indicative of signal strengths received by the one or more receivers positioned at the respective receiver locations corresponding to the one or more respective areas expected to be visited by the first individual. Furthermore, in some examples, the fifth predetermined value and/or the sixth predetermined value may be determined based on historical measurements indicative of signal strengths received by the one or more receivers positioned at the respective receiver locations corresponding to the one or more respective areas not expected to be visited by the second individual.

In some examples, the method 300 may include generating predetermined measurements indicative of signal strengths of the one or more signals transmitted by the first and/or second transmitter and intended to be received by the one or more receivers based on the one or more respective areas expected to be visited by the first and/or second individual, in response to failing to receive measurements indicative of signal strengths of one or more signals transmitted by the transmitter associated with the individual and intended to be received by the one or more receivers.

Moreover, in some examples, the method 300 may include receiving timing information indicative of ranges of time at which the areas identified as being associated with the first individual and/or the second individual are expected to be visited by the first individual. For instance, the ranges of time may each include a start time and a stop time. A determination may be made as to whether the area identified as being associated with the first individual and/or the second individual is or was visited prior to the start time, between the start time and the stop time, or after the stop time for the range of time during which first or second individual was expected to visit the area. Based on this determination, one or more actions related to the identified area may be triggered.

Figure 13:
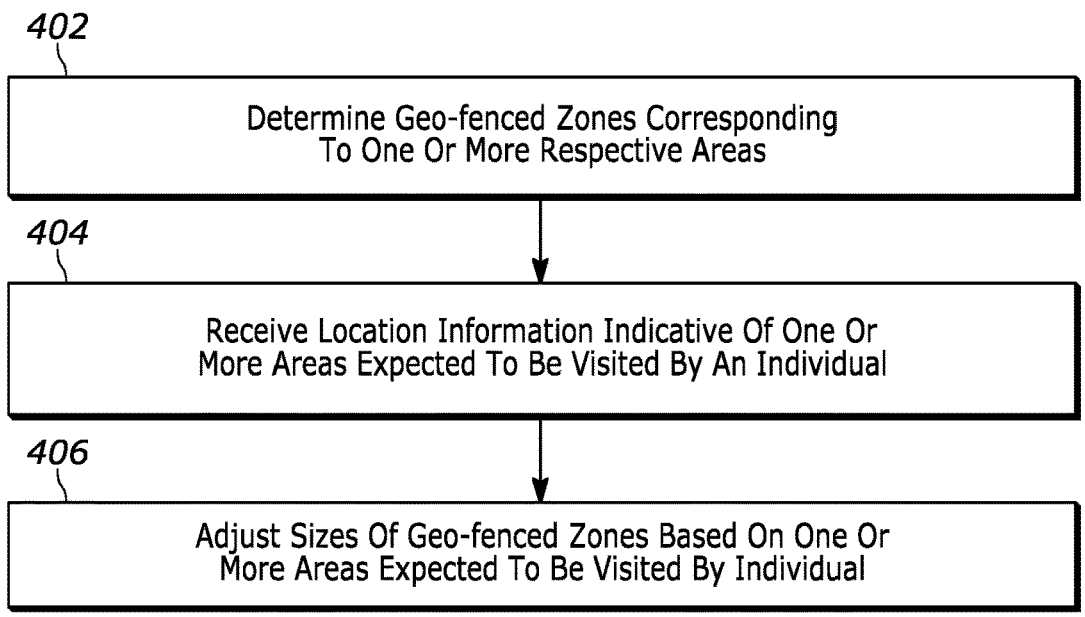
FIG. 13 illustrates a block diagram of an example process as may be implemented by the system of FIG. 6, for implementing example methods and/or operations described herein including techniques for adjusting the size of a geo-fenced zone based on an individual's likely location, as may be performed by the system of FIG. 6.

FIG. 13 illustrates a block diagram of an example process 400 as may be implemented by the system 100 of FIG. 6, for implementing example methods and/or operations described herein including techniques for adjusting the size of a geo-fenced zone based on an individual's likely location, as may be performed by the system of FIG. 6.

At block 402, one or more geo-fenced zones corresponding to one or more respective areas may be determined. For instance, the one or more respective areas may be one or more respective rooms of a facility, such as a hospital facility. Each geo-fenced zone may be bound by x-y coordinates corresponding to the x-y coordinates of the rooms of the facility.

At block 404, location information indicative of the one or more areas expected to be visited by the individual, of the one or more respective areas, may be received.

At block 406, the one or more geo-fenced zones may be adjusted based on the one or more respective areas expected to be visited by the individual. For instance, the geo-fenced zones corresponding to the one or more respective areas expected to be visited by the individual may be expanded or contracted by a predetermined value (i.e., by changing the x-y coordinates corresponding to the geo-fenced zone such that the x-y coordinates corresponding to the geo-fenced zone are larger or smaller than the x-y coordinates corresponding to the actual room of the facility). The predetermined values that are used for expanding or contracting the geo-fenced zones may be set by a user.

In some examples, the method 400 may further include receiving a measurement indicative of an estimated position of the individual (which may include x-y coordinates corresponding to the estimated position of the individual), and identifying an area associated with the individual based on comparing the estimated position of the individual to the adjusted one or more geo-fenced zones. The signals may be, e.g., radio frequency identification wireless signals or BLUETOOTH low energy (BLE) wireless signals. For instance, the measurement may be based on one or more signals transmitted by a transmitter associated with an individual and received by one or more receivers configured to receive one or more signals transmitted by the transmitter. For example, the one or more receivers may be positioned at respective receiver locations corresponding to one or more of the respective areas.

The estimated position of the individual may include x-y coordinates corresponding to the estimated position of the individual.

Moreover, in some examples, the method 400 may include receiving timing information indicative of a range of time at which the identified area is expected to be visited by the individual. The range of time may have a start time and a stop time, and a determination may be made as to whether the individual is visiting (or has previously visited) the identified area prior to the start time, between the start time and the stop time, or after the stop time, of the range of time. Based on this determination, one or more actions related to the identified area may be triggered.

Figure 14:
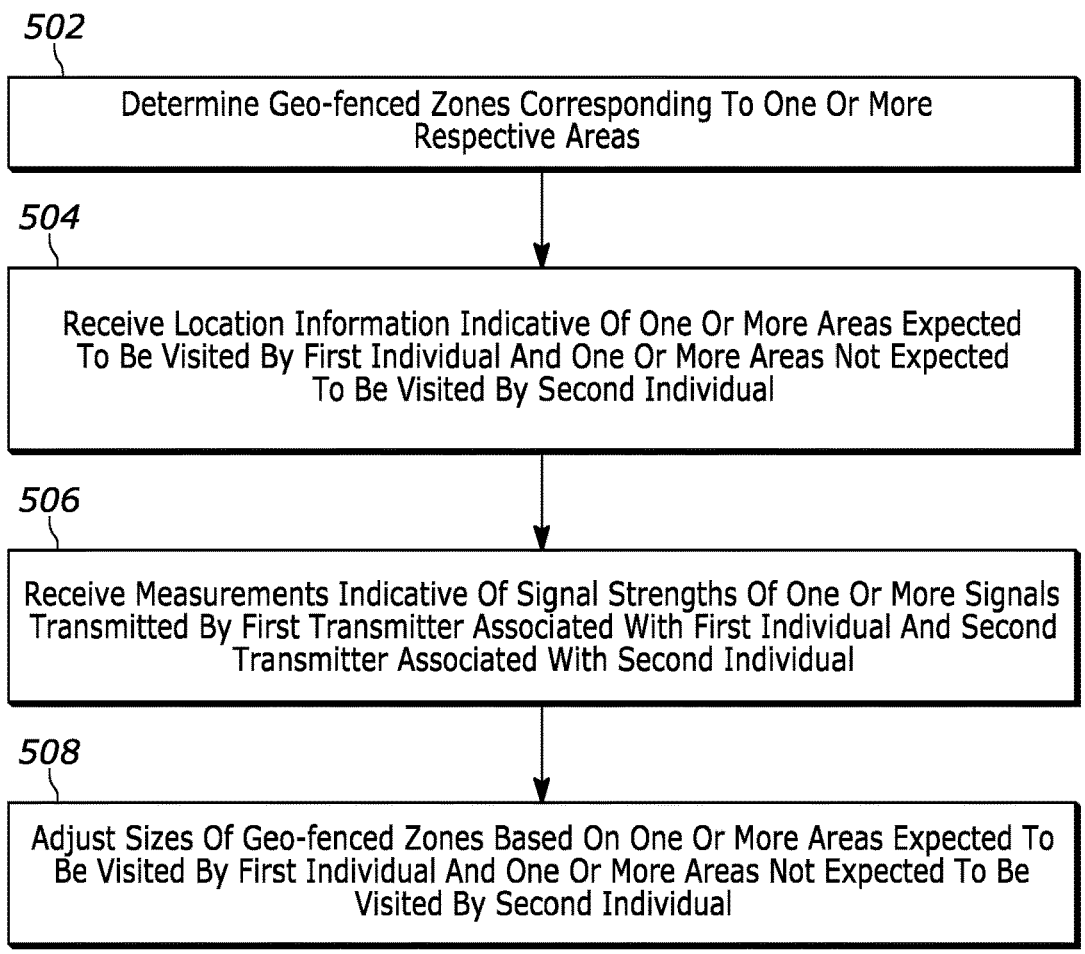
FIG. 14 illustrates a block diagram of another example process as may be implemented by the system of FIG. 6, for implementing example methods and/or operations described herein including techniques for adjusting the size of multiple geo-fenced zones based on multiple individuals' likely locations, as may be performed by the system of FIG. 6.

FIG. 14 illustrates a block diagram of another example process 500 as may be implemented by the system 100 of FIG. 6, for implementing example methods and/or operations described herein including techniques for adjusting the size of multiple geo-fenced zones based on multiple individuals' likely locations, as may be performed by the system of FIG. 6.

At block 502, one or more geo-fenced zones corresponding to one or more respective areas may be determined.

At block 504, location information indicative of at least one of one or more respective areas expected to be visited by a first individual and one or more respective areas not expected to be visited by a second individual may be received.

At block 506, measurements may be received, indicative of signal strengths of one or more signals transmitted by a first transmitter associated with the first individual and a second transmitter associated with the second individual and received by the one or more receivers.

At block 508, adjusting, the one or more geo-fenced zones may be adjusted based on one of the one or more respective areas expected to be visited by the first individual and the one or more respective areas not expected to be visited by the second individual. The one or more respective areas expected to be visited by the first individual may include the one or more respective areas not expected to be visited by the second individual.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for adjusting the size of a geo-fenced zone based on an individual's likely location, comprising:
   one or more processors; and a memory storing computer-readable instructions that, when executed by the one or more processors, cause the one or more processors to:
  determine one or more geo-fenced zones corresponding to one or more respective areas;
  receive location information indicative of the one or more areas expected to be visited by the individual, of the one or more respective areas;
  adjust the one or more geo-fenced zones based on the one or more respective areas expected to be visited by the individual;
  receive a measurement indicative of an estimated position of the individual; and
  identify an area associated with the individual based on comparing the estimated position of the individual to the adjusted one or more geo-fenced zones.

2. The system of claim 1, wherein the instructions, when executed by the one or more processors, further cause the one or more processors to:
  receive timing information indicative of a range of time at which the identified area is expected to be visited by the individual, the range of time having a start time and a stop time;
  determine that the individual is visiting the identified area (i) prior to the start time, (ii) between the start time and the stop time, or (iii) after the stop time, of the range of time at which the identified area is expected to be visited by the individual; and
  based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

3. The system of claim 1, further comprising:
  a transmitter or a transceiver associated with an individual; and
  one or more receivers configured to receive one or more signals transmitted by the transmitter or the transceiver, the one or more receivers being positioned at respective receiver locations corresponding to one or more respective areas;
  wherein the measurement is based on one or more signals transmitted by the transmitter or the transceiver and received by the one or more receivers.

4. The system of claim 3, wherein the signals are one of radio frequency identification wireless signals and BLUETOOTH low energy (BLE) wireless signals.

5. The system of claim 1, wherein each geo-fenced zone is bound by x-y coordinates, and wherein the estimated position of the individual includes x-y coordinates corresponding to the estimated position of the individual.

6. The system of claim 1, wherein causing the one or more processors to adjust the one or more geo-fenced zones based on the one or more respective areas expected to be visited by the individual includes one or more of:
  expanding the geo-fenced zones corresponding to the one or more respective areas expected to be visited by the individual by a first predetermined value, and
  contracting the geo-fenced zones corresponding to the one or more respective areas not expected to be visited by the individual by a second predetermined value.

7. The system of claim 6, wherein each of the first predetermined value and the second predetermined value is set by a user.

8. The system of claim 1, wherein the one or more respective areas include one or more respective rooms of a facility.

9. A system for adjusting the size of multiple geo-fenced zones based on multiple individuals' likely locations, comprising:
  one or more processors; and
  a memory storing computer-readable instructions that, when executed by the one or more processors, cause the one or more processors to:
  determine one or more geo-fenced zones corresponding to one or more respective areas;
  receive location information indicative of at least one of one or more respective areas expected to be visited by a first individual and one or more respective areas not expected to be visited by a second individual;
  receive measurements indicative of signal strengths of one or more signals transmitted by a first transmitter or a first transceiver associated with the first individual and a second transmitter or a second transceiver associated with the second individual and received by the one or more receivers; and
  adjust the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

10. A computer-implemented method for adjusting the size of a geo-fenced zone based on an individual's likely location, comprising:
  determining, by one or more processors, one or more geo-fenced zones corresponding to one or more respective areas;
  receiving, by the one or more processors, location information indicative of the one or more areas expected to be visited by the individual, of the one or more respective areas;
  adjusting, by the one or more processors, the one or more geo-fenced zones based on the one or more respective areas expected to be visited by the individual;
  receiving, by the one or more processors, a measurement indicative of an estimated position of the individual; and
  identifying, by the one or more processors, an area associated with the individual based on comparing the estimated position of the individual to the adjusted one or more geo-fenced zones.

11. The method of claim 10, further comprising:
  receiving, by the one or more processors, timing information indicative of a range of time at which the identified area is expected to be visited by the individual, the range of time having a start time and a stop time;
  determining, by the one or more processors, that the individual is visiting the identified area (i) prior to the start time, (ii) between the start time and the stop time, or (iii) after the stop time, of the range of time at which the identified area is expected to be visited by the individual; and
  based on determining that the individual is visiting the identified area (i) prior to the start time, (ii) between the start time and the stop time, or (iii) after the stop time, of the range of time at which the identified area is expected to be visited by the individual, triggering, by the one or more processors, one or more actions related to the identified area.

12. The method of claim 10, wherein the measurement is based on one or more signals transmitted by a transmitter or a transceiver associated with an individual and received by one or more receivers configured to receive one or more signals transmitted by the transmitter or the transceiver, the one or more receivers being positioned at respective receiver locations corresponding to one or more respective areas.

13. The method of claim 12, wherein the signals are one of radio frequency identification wireless signals and BLUETOOTH low energy (BLE) wireless signals.

14. The method of claim 10, wherein each geo-fenced zone is bound by x-y coordinates, and wherein the estimated position of the individual includes x-y coordinates corresponding to the estimated position of the individual.

15. The method of claim 10, wherein adjusting the one or more geo-fenced zones based on the one or more respective areas expected to be visited by the individual includes one or more of:
expanding the geo-fenced zones corresponding to the one or more respective areas expected to be visited by the individual by a first predetermined value, and
contracting the geo-fenced zones corresponding to the one or more respective areas not expected to be visited by the individual by a second predetermined value.

16. The method of claim 15, wherein each of the first predetermined value and the second predetermined value is set by a user.

17. The method of claim 10, wherein the one or more respective areas include one or more respective rooms of a facility.

18. A computer-implemented method for adjusting the size of multiple geo-fenced zones based on multiple individuals' likely locations, comprising:
determining, by one or more processors, one or more geo-fenced zones corresponding to one or more respective areas;
receiving, by the one or more processors, location information indicative of at least one of one or more respective areas expected to be visited by a first individual and one or more respective areas not expected to be visited by a second individual;
receiving, by the one or more processors, measurements indicative of signal strengths of one or more signals transmitted by a first transmitter or a first transceiver associated with the first individual and a second transmitter or a second transceiver associated with the second individual and received by the one or more receivers; and
adjusting, by the one or more processors, the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

19. A non-transitory computer-readable medium storing instructions for adjusting the size of a geo-fenced zone based on an individual's likely location that, when executed by one or more processors, cause the one or more processors to:
determine one or more geo-fenced zones corresponding to one or more respective areas;
receive location information indicative of the one or more areas expected to be visited by the individual, of the one or more respective areas; and
adjust the one or more geo-fenced zones based on the one or more respective areas expected to be visited by the individual;
receive a measurement indicative of an estimated position of the individual; and
identify an area associated with the individual based on comparing the estimated position of the individual to the adjusted one or more geo-fenced zones.

20. The computer-readable medium of claim 19, wherein the instructions further cause the one or more processors to:
receive timing information indicative of a range of time at which the identified area is expected to be visited by the individual, the range of time having a start time and a stop time;
determine that the individual is visiting the identified area (i) prior to the start time, (ii) between the start time and the stop time, or (iii) after the stop time, of the range of time at which the identified area is expected to be visited by the individual; and
based on determining that the individual is visiting the identified area (i) prior to the start time, (ii) between the start time and the stop time, or (iii) after the stop time, of the range of time at which the identified area is expected to be visited by the individual, trigger one or more actions related to the identified area.

21. The computer-readable medium of claim 19, wherein the measurement is based on one or more signals transmitted by a transmitter or a transceiver associated with an individual and received by one or more receivers configured to receive one or more signals transmitted by the transmitter or the transceiver, the one or more receivers being positioned at respective receiver locations corresponding to one or more respective areas.

22. The computer-readable medium of claim 19, wherein the signals are one of radio frequency identification wireless signals and BLUETOOTH low energy (BLE) wireless signals.

23. The computer-readable medium of claim 19, wherein each geo-fenced zone is bound by x-y coordinates, and wherein the estimated position of the individual includes x-y coordinates corresponding to the estimated position of the individual.

24. The computer-readable medium of claim 19, wherein adjusting the one or more geo-fenced zones based on the one or more respective areas expected to be visited by the individual includes one or more of:
expanding the geo-fenced zones corresponding to the one or more respective areas expected to be visited by the individual by a first predetermined value, and
contracting the geo-fenced zones corresponding to the one or more respective areas not expected to be visited by the individual by a second predetermined value.

25. The computer-readable medium of claim 24, wherein each of the first predetermined value and the second predetermined value is set by a user.

26. The computer-readable medium of claim 19, wherein the one or more respective areas include one or more respective rooms of a facility.

27. A non-transitory computer-readable medium storing instructions for adjusting the size of multiple geo-fenced zones based on multiple individuals' likely locations that, when executed by one or more processors, cause the one or more processors to:

determine one or more geo-fenced zones corresponding to one or more respective areas;
receive location information indicative of at least one of one or more respective areas expected to be visited by a first individual and one or more respective areas not expected to be visited by a second individual;
receive measurements indicative of signal strengths of one or more signals transmitted by a first transmitter or a first transceiver associated with the first individual and a second transmitter or a second transceiver associated with the second individual and received by the one or more receivers; and
adjust the one or more geo-fenced zones based on one of the one or more respective areas expected to be visited by the first individual and the one or more respective areas not expected to be visited by the second individual, wherein the one or more respective areas expected to be visited by the first individual include the one or more respective areas not expected to be visited by the second individual.

* * * * *